(12) United States Patent
Dalbø et al.

(10) Patent No.: US 10,138,141 B2
(45) Date of Patent: Nov. 27, 2018

(54) METHOD AND DEVICE FOR BLOWING OFF GASEOUS CONTAMINANTS FROM CRUDE WATER IN THE PRODUCTION OF DRINKING WATER

(71) Applicant: MICRODROP AQUA APS, Torshavn, Faeroerne (DK)

(72) Inventors: Suni À Dalbø, Nuussuag (GL); Karsten E. Jensen, Ringsted (DK); Finn Lebech, Taastrup (DK); Idar Beck, Klaksvik (FO); Andreas Guldager, Hillerod (DK); Peder Godsk Svejgaard, Hedehusene (DK)

(73) Assignee: MICRODROP AQUA APS, Faeroerne (DK)

( * ) Notice: Subject to any disclaimer, the term of this patent is extended or adjusted under 35 U.S.C. 154(b) by 794 days.

(21) Appl. No.: 14/346,760

(22) PCT Filed: Sep. 21, 2012

(86) PCT No.: PCT/DK2012/050353
§ 371 (c)(1),
(2) Date: Mar. 24, 2014

(87) PCT Pub. No.: WO2013/041110
PCT Pub. Date: Mar. 28, 2013

(65) Prior Publication Data
US 2014/0238238 A1  Aug. 28, 2014

(30) Foreign Application Priority Data
Sep. 23, 2011  (DK) .................................. 2011 00733

(51) Int. Cl.
*B01D 19/00* (2006.01)
*C02F 1/20* (2006.01)
(Continued)

(52) U.S. Cl.
CPC ............ *C02F 1/20* (2013.01); *B01D 19/0015* (2013.01); *B01D 19/0047* (2013.01); *B01J 19/32* (2013.01);
(Continued)

(58) Field of Classification Search
None
See application file for complete search history.

(56) References Cited

U.S. PATENT DOCUMENTS 3,563,385 A * 2/1971 Bykov ................... B01D 24/06
                                                     210/268
4,562,015 A   12/1985 Lefevre
(Continued)

FOREIGN PATENT DOCUMENTS

| DK | 2009 01225 L | 5/2011 | |
|---|---|---|---|
| FR | 857376 A * | 9/1940 | ......... B01D 19/0047 |
| WO | 99/52829 A1 | 10/1999 | |

OTHER PUBLICATIONS

Translation of FR857376, accessed Jun. 19, 2017.*
International Search Report for PCT/DK2012/050353 dated Dec. 13, 2012.

*Primary Examiner* — Amber R Orlando
*Assistant Examiner* — Phillip Y Shao
(74) *Attorney, Agent, or Firm* — Sughrue Mion, PLLC

(57) ABSTRACT

The invention relates to a method for blowing off gaseous contaminants from crude water in the production of drinking water, comprising the step of introducing the water to be treated to the top of a shielded aerator and letting it pass through stacks of tubular elements interspersed with perforated sheets, while subjected to counter current suction. In a second aspect a device is provided for blowing off gaseous contaminants from crude water according to said method.

7 Claims, 2 Drawing Sheets

Figure 1:
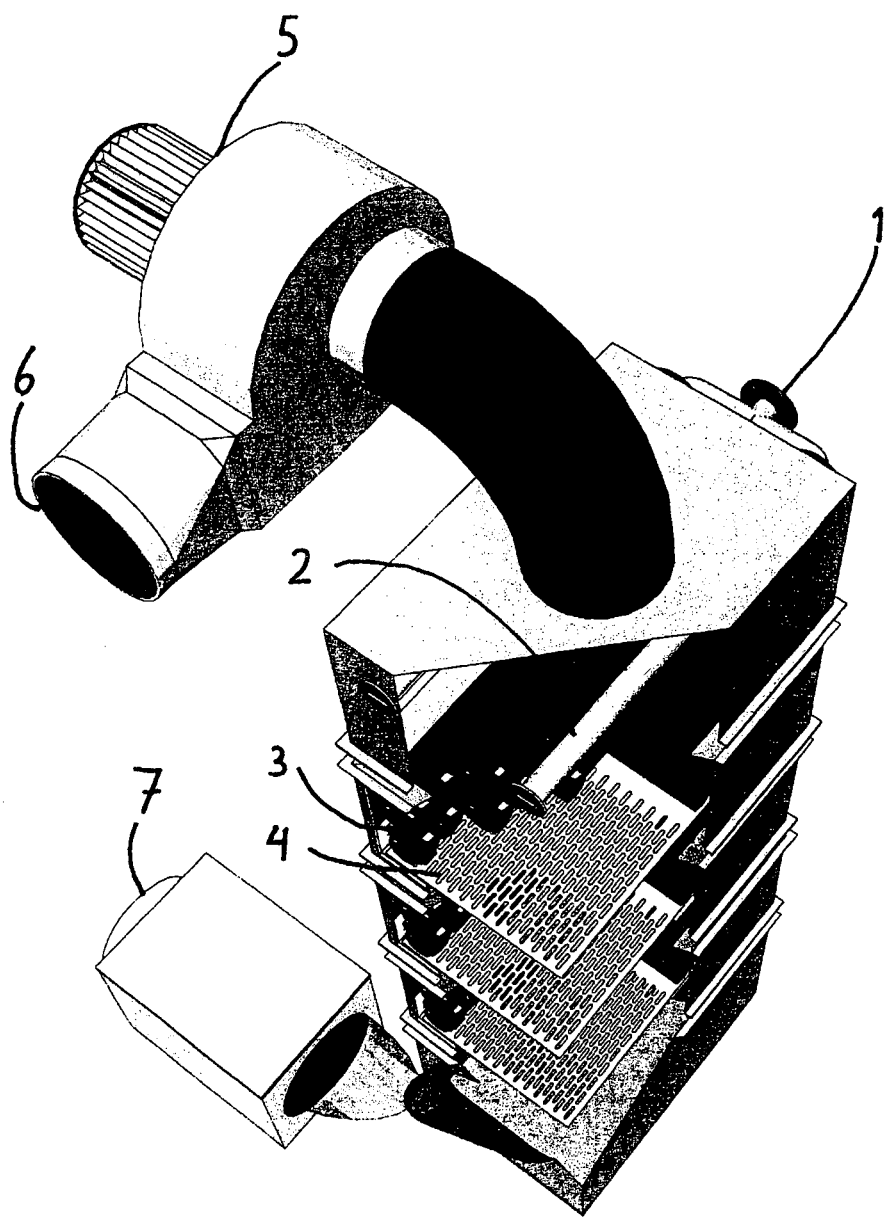

(51) Int. Cl.
  B01J 19/32  (2006.01)
  C02F 1/74  (2006.01)
  C02F 1/00  (2006.01)
  C02F 101/10  (2006.01)
  C02F 101/30  (2006.01)
  C02F 101/32  (2006.01)

(52) U.S. Cl.
  CPC ....... *C02F 1/74* (2013.01); *B01J 2219/32206* (2013.01); *B01J 2219/32237* (2013.01); *B01J 2219/32272* (2013.01); *B01J 2219/32279* (2013.01); *C02F 1/004* (2013.01); *C02F 2101/101* (2013.01); *C02F 2101/306* (2013.01); *C02F 2101/322* (2013.01)

(56) References Cited

U.S. PATENT DOCUMENTS

| | | | | |
|---|---|---|---|---|
| 5,279,746 | A * | 1/1994 | Ziol | B01D 19/0015 210/170.01 |
| 5,518,620 | A * | 5/1996 | Eguchi | B01J 19/32 210/150 |
| 5,518,668 | A * | 5/1996 | Chresand | C02F 1/20 261/113 |
| 5,718,823 | A | 2/1998 | Tomita et al. | |
| 2006/0151401 | A1* | 7/2006 | Karimnia | C02F 1/02 210/758 |
| 2009/0020482 | A1 | 1/2009 | Lebech | |

\* cited by examiner

METHOD AND DEVICE FOR BLOWING OFF GASEOUS CONTAMINANTS FROM CRUDE WATER IN THE PRODUCTION OF DRINKING WATER

CROSS REFERENCE TO RELATED APPLICATIONS

This application is a National Stage of International Application No. PCT/DK2012/050353 filed Sep. 21, 2012, claiming priority based on Danish Patent Application No. PA 2011 00733 filed Sep. 23, 2011, the contents of all of which are incorporated herein by reference in their entirety.

The present invention relates in a first aspect to a method for blowing off a gaseous contaminant from crude water in the production of drinking water. In a second aspect, the invention relates to a device for blowing off a gaseous contaminant from crude water in the production of drinking water according to the method of the first aspect of the invention.

In many places throughout the world, the supply of drinking water of a satisfactory quality is troubled by the presence of unwanted gaseous contaminants in the available crude water. This may be due to human activities within a given watershed but may also follow from the natural constitution of the underground.

Among the gaseous contaminants of crude water, hydrogen sulphide, aggressive carbon dioxide, volatile pesticides and methane are prevalent. Whereas aggressive carbon dioxide may corrode the water supply network, hydrogen sulphide and methane are often linked to problems of excessive bacterial growth and depletion of oxygen.

In the case of methane, bacteria of the genus *Methanomonas* obtain energy by the reaction $CH_4+2O_2 \rightarrow CO_2+H_2O$, thereby leading to hypoxic or anoxic conditions and thus promoting the continued growth of microaerophilic and anaerobic microorganisms as a layer of mucus on water supply installations and in the water to be supplied. Further, the oxygen consumed may be indispensable to ensure a sufficient clearance of trace species such as iron and manganese from the water by precipitation. Therefore, methane should ideally be driven out of crude water at an early treatment stage. A commonly applied limit value of methane in the final drinking water is 0.01 mg/L, while oxygen in said water is typically demanded in an amount of not less than 5 mg/L.

A conventional method for removing methane at a waterworks is treatment in an oxygenation track basin 2-3 meters deep, from the bottom of which bubbles of compressed air is released.

Alternatively, the water may be treated in a so-called INKA diffusion system, wherein the water is pre-aerated in a cascade and subsequently poured onto an expanse of typically 20-30 $m^2$ in a layer a few centimeters deep to be subjected to intense coarse-bubble air diffusion from beneath.

Both of these methods require that the water treatment takes place at ample premises, which must be vigorously ventilated but still protected from external contaminants of biotic and abiotic nature. Among further inconvenient features can be mentioned a substantial energy consumption and frequent cleaning requirements to prevent bio-fouling, obstruction of nozzles and build-up of various sediments on the submerged expanses.

A more simple lay-out of an aeration plant has been suggested by the international patent application WO 99/52829, which discloses an apparatus for treatment of water, wherein multiple divisions of drops is envisaged to occur within an arrangement of interchangeably oriented tubes. However, a tendency to confluence has been observed, inasmuch as already divided drops are seen to merge into a limited number of dominant streams, especially when arrangements of many stacked tubes are employed.

In the patent FR 857376 a stripper is described, wherein drops of water are allowed to unite and form a layer on a number of sloping ramp elements before being dispersed again by a series of spreading dishes. However, the sloping ramp elements take up a relatively large proportion of the available space within the stripper and apart from their water redistributing role they do hardly by themselves contribute in any substantial degree to the removal of gaseous contaminants from the water.

In view of the above, the object of the present invention is to provide a method and a plant for removing gaseous contaminants from water in the production of drinking water, wherein a compact, robust, effective and efficient clearance of contaminants to a low level is achieved. The method should furthermore be affordable, simple and environmentally friendly.

To meet this object, according to the first aspect of the invention a method is provided for blowing off a gaseous contaminant from crude water in the production of drinking water, said method comprising the step of introducing the water containing the gaseous contaminant into the top of a shielded aerator, said aerator comprising means for forming drops at the initiation of the treatment process, and means for causing division of said drops by contact therewith, said latter means being arranged below the means for forming drops, wherein the means for causing division of the drops comprise a plurality of tubular elements in the form of pipes having reticulate pipe walls, said tubular elements being placed in horizontal layers of several parallel tubular elements stacked in such a way that the longitudinal axes of the tubular elements in one layer are angularly displaced in relation to the longitudinal axes of the tubular elements in the one or more adjacent layers; and letting the water pass through said aerator to the bottom thereof by the force of gravity, wherein air is introduced to the bottom of the aerator and is drawn to its top and discharged together with blown-off contaminant by the aid of a pump at the top of the aerator, and wherein bubble formation and horizontal redistribution of the water is brought about as it during its passage through the aerator passes through one or more perforated sheets, which are intercalated between a number of said horizontal layers of tubular elements.

It has surprisingly been found by the inventors that the combined provision of an upward suction of air and perforated sheets between the tubular elements not only turns the capacity of the tubular elements for drop division fully to account by redistributing the flow of water evenly from each perforated sheet without taking up much space, but, notably, also results in a remarkable generation of bubbles at each sheet perforation. The combined result of these two effects is most propitious, and an extensive removal of gaseous contaminants is observed.

With the findings of the inventors, an efficient yet simple method is provided, wherein a combined and thorough passing of water through air and passing of air through water is effected in a restricted space, while the energy consumption is relatively modest.

Preferably, the perforations in the sheets are of an oblong shape, presenting a width of 1.5-10 mm, preferentially 2 mm, and a length of 12-50 mm, most preferred 20 mm. The sheets advantageously are made of stainless steel and favourably show a thickness of 1-5 mm, favourably 1.5 mm. Preferably, the perforations account for 30-60%, most preferred 40-50%, of the surface area of the sheets.

According to a preferred embodiment of the invention, the gaseous contaminant is hydrogen sulphide, aggressive carbon dioxide, a volatile pesticide or, preferably, methane. Other hydrocarbon contaminants may also come into question, however. In an alternative embodiment, the method may be performed with a view to other beneficial effects of aeration and oxygenation of the treated water.

In a favourable embodiment of the invention, a vacuum is maintained within the aerator, whereby the risk of biofilm establishment on the various inner parts of the aerator is diminished. The provision of a vacuum not only restricts the concurrent availability of oxygen and methane to microorganisms at a given location within the aerator, but also makes it easier to keep it tight and protected against intrusion of contaminant particles or organisms.

Advantageously, treated water is led from the bottom of the aerator to a sand filter for removal of residual contaminants. Alternatively, the treated water may be led to another type of filter or subjected to a step of sedimentation, wherein precipitates formed by oxidation may settle in a suitable vessel, optionally at the bottom of the aerator.

To meet the aforementioned object, according to the second aspect of the invention a device for blowing off a gaseous contaminant from crude water in the production of drinking water is provided, said device comprising a shielded aerator, said aerator comprising means at its top for forming drops at the initiation of the treatment process, and means for causing division of said drops by contact therewith, said latter means being arranged below the means for forming drops, wherein the means for causing division of the drops comprise a plurality of tubular elements in the form of pipes having reticulate pipe walls, said tubular elements being placed in horizontal layers of several parallel tubular elements stacked in such a way that the longitudinal axes of the tubular elements in one layer are angularly displaced in relation to the longitudinal axes of the tubular elements in the one or more adjacent layers; said elements allowing divided drops to pass through said aerator to the bottom thereof by the force of gravity; the device further comprising a suction pump at the top exterior part of the aerator and an air inlet at the bottom of the aerator, as well as one or more perforated sheets being intercalated between a number of the horizontal layers of tubular elements.

Said device provides the same or similar advantages as the first aspect of the invention and due to its modest requirements for energy, materials and space is suitable for installation and maintenance under primitive and/or compressed conditions.

According to a specific, favourable embodiment, the shielded aerator is of a modular constitution and comprises a top module holding the means for forming drops at the initiation of the treatment process; one, two, three or more processing modules each holding several horizontal layers of said tubular elements and at least one of said perforated sheets; and a bottom module; wherein all of the modules or their respective contents are independently exchangeable and amenable to servicing.

In one embodiment, the shielded aerator is of particularly restricted size, so that it can be contained within a volume presenting the external dimensions of 80 cm×120 cm×300 cm, corresponding to standard pallet dimensions.

In the following, a preferred embodiment of the invention will be illustrated by reference to the non-limiting figures.

FIG. 1 illustrates an embodiment of the device according to the second aspect of the invention, said device being for carrying out the method according to the first aspect of the invention. The device is depicted in perspective from an elevated, diagonal viewpoint. In the figure, a part of the exterior surface of said device is made invisible in order to enable inspection of its interior parts.

Figure 2:
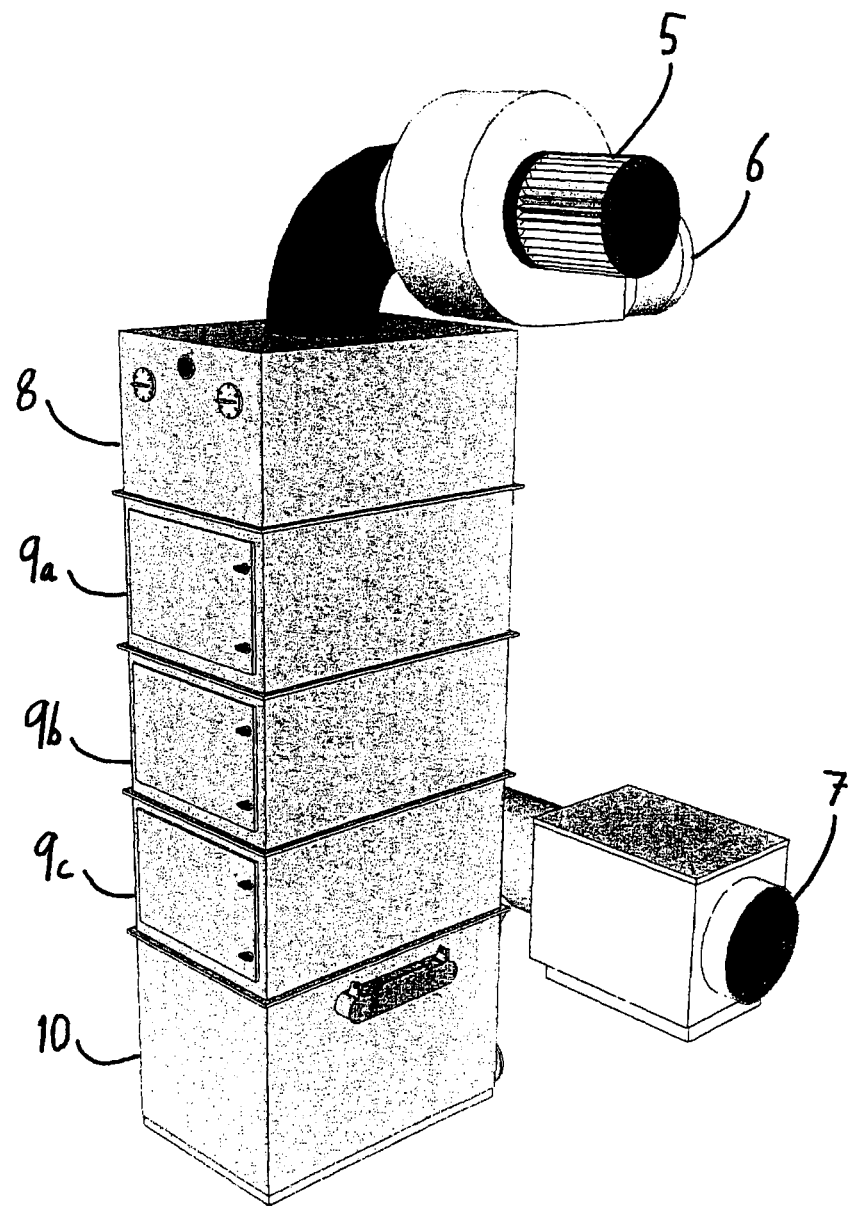

FIG. 2 illustrates a similar embodiment of said device from a slightly different viewpoint. The external surface of the closed device is shown, so that the modular constitution of the embodiment may be observed.

Referring to FIG. 1, the main features of the illustrated plant are referenced by numbers as follows: 1 is an inlet for receiving water to be treated in the device; 2 is a pipe provided with slots (not shown) for forming drops by flow of the water through the slots at the initiation of the treatment process; 3 is one of many tubular elements for causing division of drops, in the form of pipes having reticulate pipe walls; 4 is a perforated sheet, 5 is a suction pump with an air outlet 6; 7 is an air filter, which is shown in a disassembled state for the sake of visibility.

On FIG. 2, the main additional features of the illustrated closed device are referenced by numbers as follows: 8 is a top module holding means for forming drops at the initiation of the treatment process (not shown); 9a, 9b, and 9c are processing modules holding tubular elements and perforated sheets (not shown) and each provided with wickets for service; 10 is a bottom module, from which treated water leaves through the water outlet 11.

An overall description of a preferred embodiment of the method according to the invention will now be given.

An amount of crude water loaded with gaseous contaminants is led through the inlet 1 to the pipe 2, which is provided with a number of slots, so that the water arrives as drops into the aerator. During the course of their fall through the aerator, the drops impinge on a multitude of alternating layers of reticulate tubular elements 3, mutually displaced by 90°, so that the drops are divided into droplets. The formation of droplets results in a substantially larger drop surface area relative to drop volume, so that enhanced enrichment with oxygen can take place. In the current embodiment, the reticulate tubular elements are made of plastic and present an external diameter of 70 mm. The tubular elements are fixed with strips and contained in three processing modules 9a, 9b, and 9c, each of which is packed with six layers of said elements. Within and between layers, the tubular elements abut each other.

At the bottom of each of said processing modules, the water arrives at a sheet 4 made of stainless steel of a thickness of a few millimeters and provided with numerous slots, each being a few millimeters broad and somewhat longer. Oblong openings are preferred over round holes, because they are not so easily obstructed by ferric and calcareous deposits. The sheets are hold in guides, from which they may be drawn out for cleaning like baking sheets in an oven. In order to accommodate variations in the amount of supplied water, sheets with a differing number of openings may be replaced one another.

The sheets serve the double purpose of spreading evenly the water, which might otherwise have concentrated in certain areas of the aerator during its passage across the tubular elements, and, notably, being the hotbed of bubble formation, thus playing an important role in oxygen enrichment and expulsion of gaseous contaminants.

The generation of bubbles at the perforated sheets is significantly furthered by the suction pump 5 that produces a countercurrent air stream from the inlet of the air filter 7 to the outlet 6 of the suction pump, which assists in blowing off contaminants and further aerating the water. Moreover, a vacuum is effected by the suction within the aerator, which makes it easier to keep it tight and protected against intrusion of contaminant particles or organisms. The suction pump is set to an air flow of approximately 4000 m$^3$ atmospheric air per hour through the aerator, which in the current embodiment presents a horizontal cross section area of about 0.8 m$^2$. The vacuum might have been adjusted also by varying the diameter of the inlet of the air filter 7.

Finally, the water reaches the bottom module 10, from where it passes through the outlet 11 to a sand filter with a view to scavenging of residual gaseous contaminants.

EXAMPLE

A device according to the invention was installed and received crude water containing a high level of methane in two test runs. The device was equipped with intercalated sheets of stainless steel showing a thickness of 1.5 mm and having 42% of their surface area punched as oblong perforations. Each perforation presented a width of 2 mm and a maximum length of 20 mm.

In one test, the methane concentration was reduced from 20 mg/L to 0.6 mg/L at a water flow rate of 13 m$^3$/h.

In the other test, the methane concentration was brought down from 8 mg/L to 0.13 g/L, while maintaining a water flow of 35 m$^3$/h.

In both tests, a profuse production of bubbles was observed at the perforations.

The invention claimed is:

1. A method for blowing off a gaseous contaminant from crude water in the production of drinking water, said method comprising the step of introducing the water containing the gaseous contaminant into the top of a shielded aerator, said aerator comprising means for forming drops at the initiation of the treatment process, and division means for causing division of said drops by contact therewith, said division means being arranged below the means for forming drops, wherein the division means for causing division of the drops comprise a plurality of tubular elements in the form of pipes having reticulate pipe walls, said tubular elements being placed in horizontal layers of plural parallel tubular elements stacked in such a way that the longitudinal axes of the tubular elements in one layer are angularly displaced in relation to the longitudinal axes of the tubular elements in the one or more adjacent layers;

letting the water pass through said aerator to the bottom thereof by the force of gravity; and wherein air is introduced to the bottom of the aerator and is drawn to the top of the aerator and discharged together with blown-off contaminant by a pump at the top of the aerator, and wherein bubble formation and horizontal redistribution of the water is brought about as the water passes through one or more perforated sheets, which are intercalated between a number of said horizontal layers of tubular elements.

2. The method according to claim 1, wherein the gaseous contaminant is hydrogen sulphide, aggressive carbon dioxide, a volatile pesticide or methane.

3. The method according to claim 2, wherein the gaseous contaminant is methane.

4. The method according to claim 1, wherein treated water is led from the bottom of the aerator to a sand filter for removal of residual contaminants.

5. A device for blowing off a gaseous contaminant from crude water in the production of drinking water, said device comprising a shielded aerator, said aerator comprising means at a top thereof for forming drops at the initiation of the treatment process, and division means for causing division of said drops by contact therewith, said division means being arranged below the means for forming drops, wherein the division means for causing division of the drops comprise a plurality of tubular elements in the form of pipes having reticulate pipe walls, said tubular elements being placed in horizontal layers of several parallel tubular elements stacked in such a way that the longitudinal axes of the tubular elements in one layer are angularly displaced in relation to the longitudinal axes of the tubular elements in the one or more adjacent layers; said elements allowing divided drops to pass through said aerator to the bottom thereof by the force of gravity, the device further comprising a suction pump at the top exterior part of the aerator and an air inlet at the bottom of the aerator, as well as one or more perforated sheets being intercalated between a number of the horizontal layers of tubular elements.

6. The device according to claim 5, wherein said shielded aerator is of a modular constitution and comprises a top module holding the means for forming drops at the initiation of the treatment process; one, two, three or more processing modules each holding several horizontal layers of said tubular elements and at least one of said perforated sheets; and a bottom module; wherein all of the modules or their respective contents are independently exchangeable and amenable to servicing.

7. The device according to claim 5, wherein said shielded aerator is contained within a volume presenting external dimensions of 80 cm ×120 cm ×300 cm.

* * * * *